June 1, 1948.  J. M. JOHNSON ET AL  2,442,604
MECHANISM FOR STRAIGHTENING AUTOMOBILE FENDERS
Filed Feb. 13, 1946  2 Sheets-Sheet 1
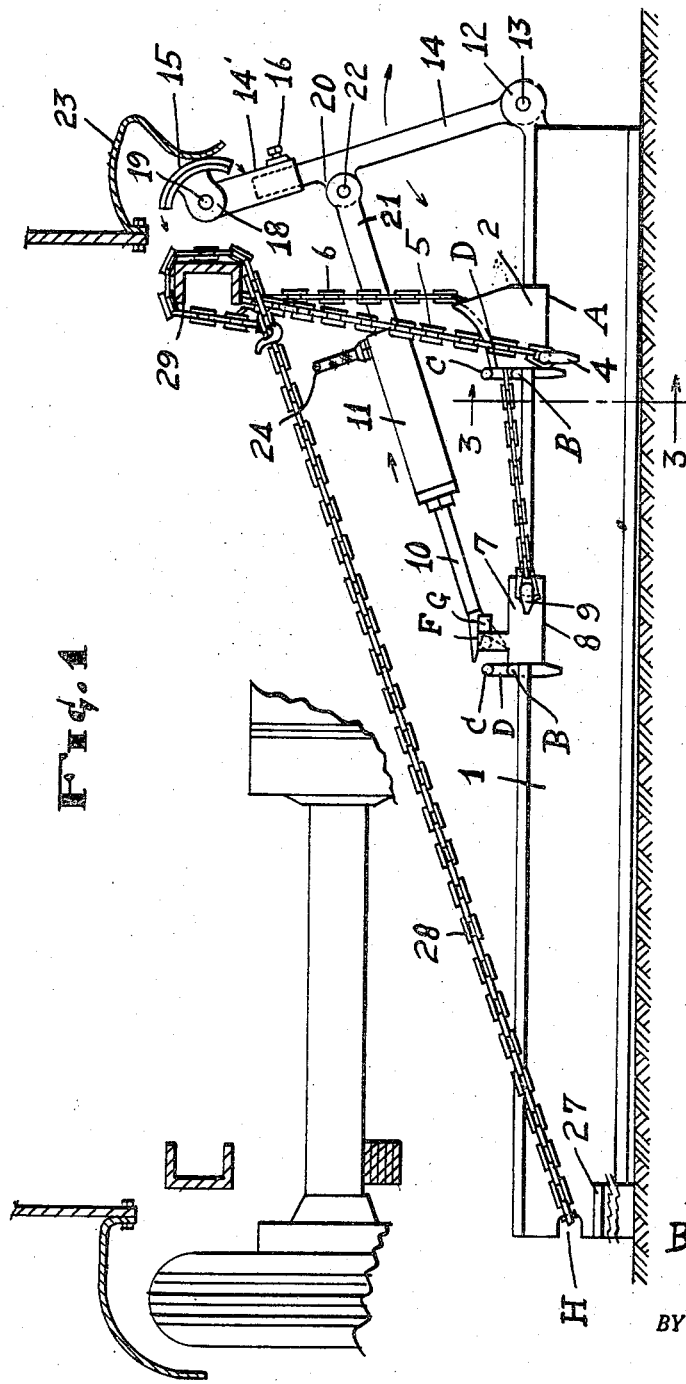
JOHN M. JOHNSON
BERNARD P. LEAF
INVENTORS June 1, 1948. J. M. JOHNSON ET AL 2,442,604
MECHANISM FOR STRAIGHTENING AUTOMOBILE FENDERS
Filed Feb. 13, 1946 2 Sheets-Sheet 2
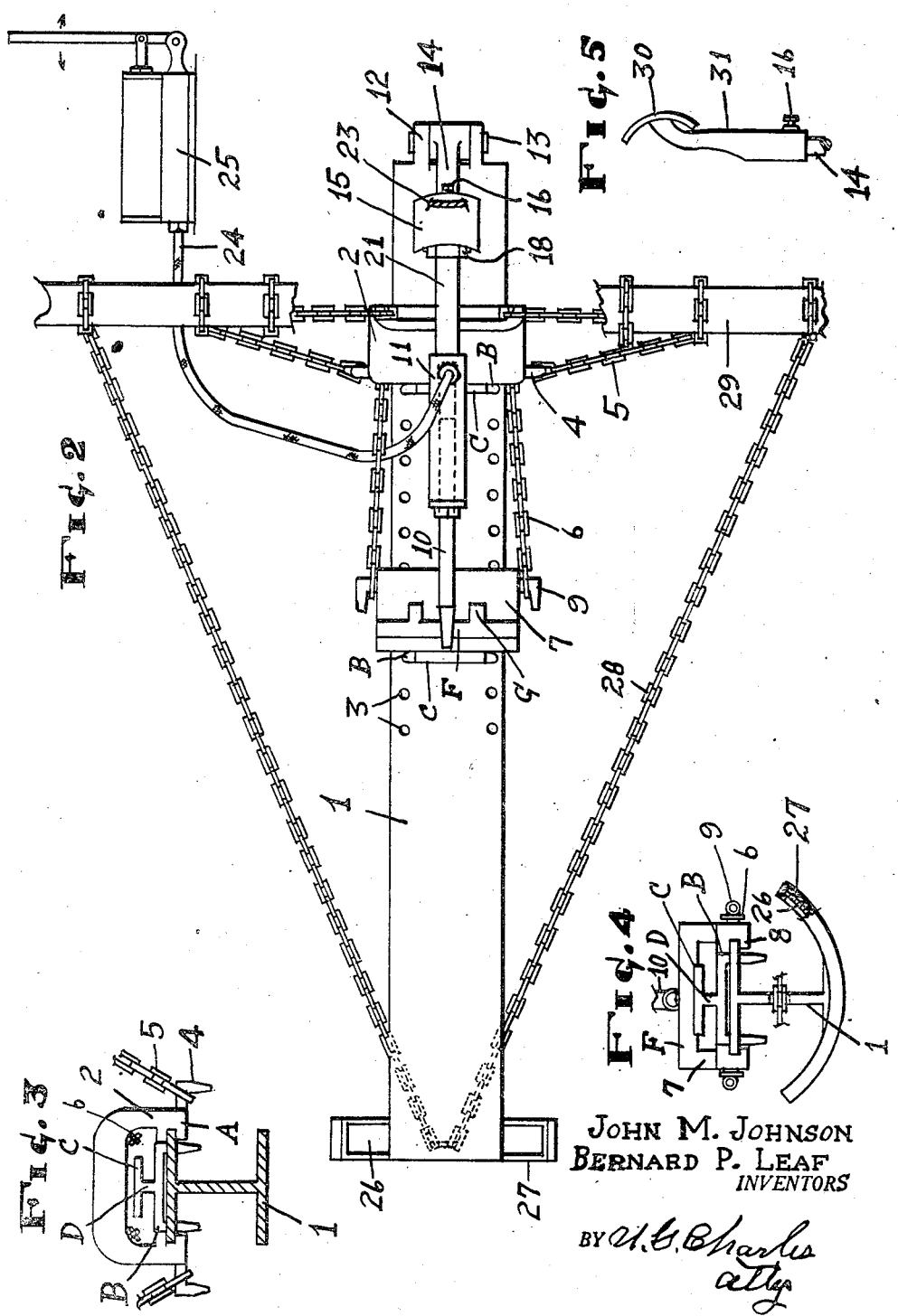
John M. Johnson
Bernard P. Leaf
INVENTORS Patented June 1, 1948

2,442,604

UNITED STATES PATENT OFFICE 2,442,604

MECHANISM FOR STRAIGHTENING AUTOMOBILE FENDERS

John M. Johnson and Bernard P. Leaf, Lindsborg, Kans.

Application February 13, 1946, Serial No. 647,330

1 Claim. (Cl. 153—39)

This invention relates to a mechanism for straightening automobile fenders, and has for one of its objects, a power actuated dolly to straighten fenders without removing the fenders from a vehicle body, and more particularly when such fenders are bent at congested places where hammer strokes are practically impossible. Fenders are frequently removed to straighten the same by any conventional means but their normal shapes are distorted slightly after straightening which makes it difficult to replace the fenders.

A further object of this invention is to construct a mechanism having chain anchoring means to rigidly secure the mechanism to a vehicle to straighten a fender without removal thereof from the vehicle, said anchoring means being adjustably arranged to position the dolly to a desired place of action, and said dolly having hydraulic power means to actuate the same in its action of straightening inwardly depressed fenders which depressions are caused by accidental collisions, or otherwise.

A still further object of this invention is to arrange a mechanism that relies upon an automobile structure for its support while working on fenders, in other words, no prearrangement is required to cause its function other than its component parts and the vehicle to be worked upon; and furthermore to construct a mechanism that is easily collapsed for transportation, simple to assemble for action, and efficient in its performance when assembled.

These and other objects will hereinafter be more fully explained, reference being had to the accompanying drawings forming a part of this specification, and in which like characters will apply to like parts in the different views.

Referring to the drawings:

Fig. 1 is a side view of the mechanism assembled for action and showing a fragmentary portion of a vehicle.

Fig. 2 is a plan view of Fig. 1.

Fig. 3 is a sectional view taken on line 3—3 in Fig. 1.

Fig. 4 is an end view with the dolly and hydraulic ram removed.

Fig. 5 is an elevation of the dolly modified.

The mechanism consists of an I-beam 1, of suitable length and referred to as having forward and rearward ends. Said beam has positioned on its upper extremity an anchor block 2 that slidably engages therealong. Said block at its lower portion has return bends A for each side thereof that are adapted to engage along the underside of the I-beam's upper legs. Said legs have a plurality of apertures 3 in spaced relation therealong and correspondingly located to receive a stop element comprising a body portion B that seats on the upper extremity of the said I-beam, while the ends of said body portion being positioned downwardly at right angle thereto and adapted to engage in the apertures. The said body portion B has a lift C to raise and position the stop for its engagement, and being connected to the body portion by a neck D as spacing means for the lift from the body to easily manipulate the same, said body portion being means to function as a stop for the anchor block 2. It will be seen that the return bent portions of the block each have a hook 4 extending outwardly and oppositely and to which their respective anchor chains 5, later described, will be attached. It will also be understood that the portion of the block 2 above the upper extremity of the I-beam is hollow to receive a pair of anchor chains 6 slidably engaging therethrough, the purpose of which is later described.

It will be seen in the drawings that another anchor block 7 is arranged to slidably engage on the upper legs of the I-beam and being secured, selectively, therealong by a stop similar as that for the first said block and identified by similar reference characters. Last said block has similar return bends 8 as that of the first said block to engage on the legs of the I-beam while its hook elements 9 extend outwardly and rearwardly in parallelism with the legs of the beam to engage the ends of chains 6. Last said block has on its upper side a lip F with an opening therethrough to receive a piston rod 10 of a hydraulic cylinder 11 through the medium of its bifurcated end, one leg of which extends through the opening while the other leg rests on the upper extremity of the lip and being centrally secured by lugs G extending outwardly from the lip and between which the crotch of the bifuration is positioned.

Outwardly extending from the upper legs at the forward end of the I-beam is a pair of ears 12 that are drilled in registry to receive a pin 13 engaging therethrough. Said pin and ears are means to rockably support a shank 14 that has its lower end seated between the ears. The upper end of the shank slidably engages in a sleeve 14' of a dolly head 15, said sleeve 14' being secured to the shank by a cap screw 16. The upper portion of said sleeve has the dolly head 15 rockably secured thereto, said head comprising a concavo-convex disc-like structure with a pair of ears 18 spaced apart and being on the concavity side, said ears being bored to rockably engage on the outer end of the sleeve through the medium of a pin 19 that engages through said ears and flattened end of the sleeve.

Integrally joined to the shank a spaced distance downward from the sleeve is an extension 20 that is flattened and bored to rockably connect the forward end of the cylinder thrust arm 21, said arm being bifurcated to straddle the said flattened extension and being bored in registry therewith to receive by a pin 22, whereby when the hydraulic cylinder is energized the dolly is rocked to straighten an accidental indentation that appears in a fender 23. It will be seen that the cylinder of the ram has a feed pipe 24 connected adjacent its closed end and extending to a source of power which comprises a pump 25 that is manually operated to circulate the hydraulic fluid for reciprocal movement of the dolly structure.

Rigidly secured to the underside of the I-beam at its outer end is an arcuate member 26 that is covered by a jacket, as at 27, on its peripheral face, whereby the I-beam is capable of being rocked on its longitudinal axis when placed on a floor to accommodate for a desired position of the headed shank preparatory to straightening a fender.

As a means to secure the I-beam against outward and lateral movement from its point of engagement it will be seen in Figs. 1 and 2 that the ends of a chain 28 are secured to one side frame 29 of the vehicle, while its intermediate portion engages in a notch H formed in the web of the beam to avoid disengagement of the chain during action of the mechanism. In co-action with said chain 28 is the pair of chains 5 previously described to restrict the beam from rocking laterally and on its longitudinal axis thereof, and furthermore said chains are adjustable to retain the beam at a predetermined rocked position at the time of adjusting the mechanism for operation.

It will be understood that the pair of chains 5 is eliminated under certain conditions when straightening fenders, in which instance, chains 6 may take the place thereof when block 7 is released by its pin for sliding movement of the block on the I-beam. The sliding movement of the block is caused by the thrust of the hydraulic ram, while the headed shank may be suitably anchored against response to the thrust (said anchor not shown in the drawings). The block 7 in its movement will tighten chains 6 that are attached thereto and to the side frame of the vehicle, and as the chains 6 slidably engaging through the opening in the block 2, is means to raise the forward end of the I-beam so that the concavo-convex portion of the head will move vertical to straighten a dent in a fender along its upper extremity. In some cases, the said concavo-convex head may be restricted against outward movement by the fender itself, whereby the principal force will be impinged against the upper indenture mentioned by action of the hydraulic ram raising the beam and said headed shank through the medium of said chains 6 as the said block 7 responsive to the thrust of the hydraulic ram will slide the block toward the outer end of the I-beam.

In Fig. 5 is illustrated a modified construction of the headed shank, in which case, the concavo-convex disc-like element 30 is rigidly secured to the upper end of its sleeve 31. The sleeve is of an appreciable length as to render it possible to enter the upper portion of the head structure in a more congested place than with the other arrangement shown in Fig. 1, and will function equally as well except when engaging the upper extremity of a fender. Furthermore, the I-beam herein disclosed and described may be replaced by a tubular member having a sector of its outer end cushioned with a rubber member to function similar to the arcuate member as shown and described for the I-beam, and such other modifications may be made as lie within the scope of the appended claim:

Having fully described our invention what we claim as new and desire to secure by Letters Patent is:

In a mechanism for straightening automobile fenders, of the class described, comprising a supporting beam of appreciable length, a dolly structure comprising a shank, a sleeve and a concavo-convex disc rockably secured to the sleeve, said shank having one of its ends rockably secured to one end of the beam, the other end of the shank having the sleeve adjustably secured thereon, a block and means to slidably engage the same on the beam longitudinally thereof, a hydraulic ram having a piston rod outwardly extending from one end thereof and being rockably connected to the block, the other end of the hydraulic ram being rockably connected to the shank to rock the free end of said shank away from the block, a stop to secure the block against further movement on the supporting beam when engaged by the hydraulic ram, and hydraulic power means to actuate the piston rod.

JOHN M. JOHNSON.
BERNARD P. LEAF.

REFERENCES CITED

The following references are of record in the file of this patent:

UNITED STATES PATENTS

| Number | Name | Date |
|---|---|---|
| 1,676,263 | Hawkins | July 10, 1928 |
| 1,815,180 | Bennett | July 21, 1931 |
| 2,100,564 | Mandl et al. | Nov. 30, 1937 |